(12) United States Patent
Kim et al.

(10) Patent No.: US 9,753,532 B2
(45) Date of Patent: Sep. 5, 2017

(54) IMAGE PROCESSING METHOD AND IMAGE PROCESSING APPARATUS

(71) Applicant: SAMSUNG ELECTRONICS CO., LTD., Suwon-si, Gyeonggi-Do (KR)

(72) Inventors: Young-Gwan Kim, Seoul (KR); Taek-Hyun Kim, Seongnam-si (KR); Hyun-Chang Kim, Gunpo-si (KR); Chan-Wook Park, Seongnam-si (KR); Jung-Min Oh, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 105 days.

(21) Appl. No.: 14/789,236

(22) Filed: Jul. 1, 2015

(65) Prior Publication Data

US 2016/0034021 A1 Feb. 4, 2016

(30) Foreign Application Priority Data

Aug. 1, 2014 (KR) .................. 10-2014-0099100

(51) Int. Cl.
*G09G 5/00* (2006.01)
*G06F 1/32* (2006.01)
*G06T 1/20* (2006.01)

(52) U.S. Cl.
CPC .............. *G06F 1/3293* (2013.01); *G06T 1/20* (2013.01)

(58) Field of Classification Search
CPC ........... G09G 5/393; G09G 2340/0435; G09G 2310/04; G06T 15/205; H04N 5/145; H04N 7/014; H04N 7/0127; G06F 3/1415; G06F 3/1462
See application file for complete search history.

(56) References Cited

U.S. PATENT DOCUMENTS

| | | | |
|---|---|---|---|
| 7,006,157 B2 | 2/2006 | Sohn | |
| 2008/0055318 A1 | 3/2008 | Glen | |
| 2012/0254645 A1 | 10/2012 | Jeganathan et al. | |
| 2013/0057519 A1* | 3/2013 | Kerofsky | G09G 5/028 345/204 |
| 2014/0002730 A1 | 1/2014 | Thomson et al. | |
| 2014/0285497 A1* | 9/2014 | Fonseca | G06F 3/1462 345/501 |

FOREIGN PATENT DOCUMENTS

| | | |
|---|---|---|
| JP | 2009-216900 | 9/2009 |
| JP | 2011-186834 | 9/2011 |
| KR | 1020010057142 | 7/2001 |
| KR | 1020030083070 | 10/2003 |
| KR | 1020050022555 | 3/2005 |
| KR | 1020050062116 | 6/2005 |
| KR | 1020120118283 | 10/2012 |

* cited by examiner

*Primary Examiner* — Hau Nguyen
(74) *Attorney, Agent, or Firm* — F. Chau & Associates, LLC

(57) ABSTRACT

An image processing method includes receiving a first image rendered by a graphics processing unit (GPU) from the GPU, comparing the first image with a second image rendered by the GPU before the first image, and controlling a rendering frequency of the GPU based on a result of comparing the first image with the second image.

19 Claims, 12 Drawing Sheets

IMAGE PROCESSING METHOD AND IMAGE PROCESSING APPARATUS

CROSS-REFERENCE TO RELATED APPLICATIONS

This application claims priority under 35 U.S.C. §119 to Korean Patent Application No. 10-2014-0099100 filed on Aug. 1, 2014, the disclosure of which in incorporated by reference herein its entirety.

TECHNICAL FIELD

Exemplary embodiments of the present inventive concept relate to an image processing method and image processing apparatus.

DISCUSSION OF THE RELATED ART

A graphics processing unit (GPU) that processes a graphics operation, such as image rendering, may be mounted on a mobile device, such as a smartphone or a tablet, as well as a portable computing device, such as a notebook computer. When the portable computing device or the mobile device is supplied with power from a battery, the GPU consumes some of the power supplied by the battery.

SUMMARY

Exemplary embodiments of the present inventive concept provide an image processing method which can adjust the power consumed by a graphics processing unit (GPU) by controlling a rendering frequency of the GPU.

Exemplary embodiments of the present inventive concept further provide an image processing apparatus which can adjust the power consumed by a graphics processing unit (GPU) by controlling a rendering frequency of the GPU.

According to an exemplary embodiment of the present inventive concept, an image processing method includes receiving a first image rendered by a graphics processing unit (GPU) from the GPU, comparing the first image with a second image rendered by the GPU before the first image, and controlling a rendering frequency of the GPU based on a result of comparing the first image with the second image.

According to an exemplary embodiment of the present inventive concept, an image processing method includes receiving a first image rendered by a graphics processing unit (GPU) and displayed in a first window, receiving a second image rendered by the GPU and displayed in a second window, comparing the first image with a third image rendered by the GPU before the first image and displayed in the first window, comparing the second image with a fourth image rendered by the GPU before the second image and displayed in the second window, and controlling a first rendering frequency of the GPU for the first window and a second rendering frequency of the GPU for the second window based on a result of comparing the first image with the third image and comparing the second image with the fourth image.

According to an exemplary embodiment of the present inventive concept, an image processing apparatus includes a data monitor configured to receive a first image rendered by a graphics processing unit (GPU), a rendering frequency controller configured to compare the first image with a second image rendered by the GPU before the first image, and control a rendering frequency of the GPU based on a result of comparing the first image with the second image.

According to an exemplary embodiment of the present inventive concept, an image processing apparatus includes a data monitor configured to receive a first image rendered by a graphics processing unit (GPU) and displayed in a first window, and receive a second image rendered by the GPU and displayed in a second window, and a rendering frequency controller configured to compare the first image with a third image rendered by the GPU before the first image and displayed in the first window, compare the second image with a fourth image rendered by the GPU before the second image and displayed in the second window, and control a first rendering frequency of the GPU for the first window and a second rendering frequency of the GPU for the second window based on a result of comparing the first image with the third image and comparing the second image with the fourth image.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
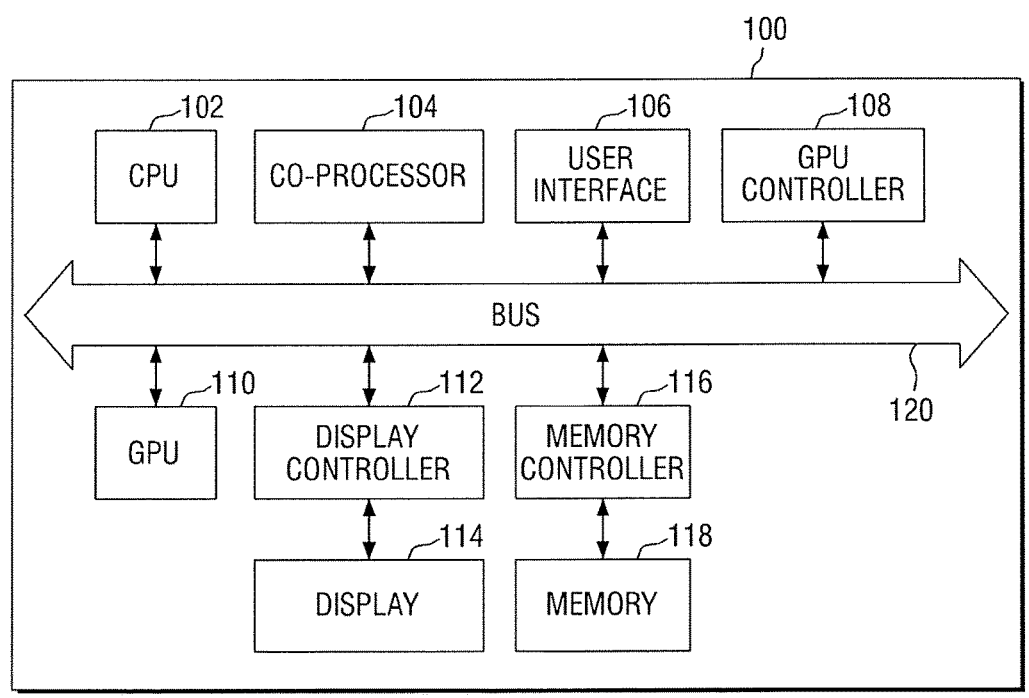
FIG. 1 is a block diagram of a computing device that implements an image processing method according to exemplary embodiments of the present inventive concept.

Exemplary embodiments of the present inventive concept will be described more fully hereinafter with reference to the accompanying drawings. Like reference numerals may refer to like elements throughout the accompanying drawings.

It will be understood that when an element or layer is referred to as being "on", "connected to" or "coupled to" another element or layer, it can be directly on, connected or coupled to the other element or layer or intervening elements or layers may be present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Herein, when two or more elements or values are described as being substantially the same as or equal to each other, it is to be understood that the elements or values are identical to each other, indistinguishable from each other, or distinguishable from each other but functionally the same as each other as would be understood by a person having ordinary skill in the art. Further, it is to be understood that while parameters may be described herein as having "about" a certain value, according to exemplary embodiments, the parameter may be exactly the certain value or approximately the certain value.

FIG. 1 is a block diagram of a computing device 100 that implements an image processing method according to exemplary embodiments of the present inventive concept.

Referring to FIG. 1, the computing device 100 may include a CPU 102, a co-processor 104, a user interface 106, a graphics processing unit (GPU) 110, a display controller 112, a memory controller 116 and a bus 120. The CPU 102, the co-processor 104, the user interface 106, the GPU 110, the display controller 112 and the memory controller 116 may communicate with each other through the bus 120. The display controller 112 and the memory controller 116 may control the display 114 and the memory 118, respectively, and may exchange data with respect to the display 114 and the memory 118. In exemplary embodiments of the present inventive concept, the computing device 100 may be, for example, a personal computer, a desktop computer, a laptop computer, computer workstation, a video game platform/console, a wireless communication device, a handheld device, a television, a server, a network device, a mainframe computer or other devices capable of processing or displaying graphics data, however, the computing device 100 is not limited thereto.

In exemplary embodiments of the present inventive concept, the computing device 100 may further include a GPU controller 108. For example, when the image processing method of the present inventive concept is implemented in software or in program code, the software or the program code may be executed by the CPU 102 or the co-processor 104. However, when the image processing method of the present inventive concept is implemented in a hardware manner using, for example, an image processing apparatus, the image processing apparatus may be included in the computing device 100 as an independent functional block (e.g., the GPU controller 108). The GPU controller 108 may also communicate with the CPU 102, the co-processor 104, the user interface 106, the GPU 110, the display controller 112 and the memory controller 116 through the bus 120.

Figure 2:
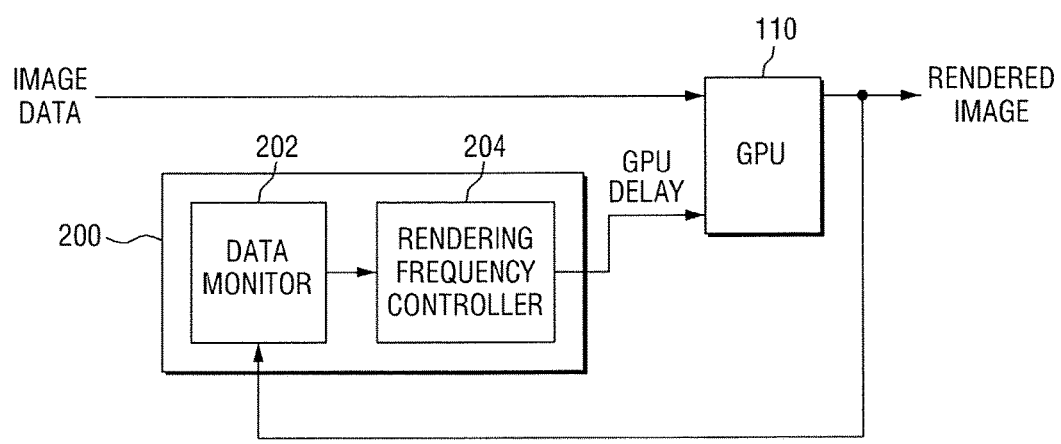
FIG. 2 is a block diagram of an image processing apparatus according to an exemplary embodiment of the present inventive concept.

FIG. 2 is a block diagram of an image processing apparatus according to an exemplary embodiment of the present inventive concept.

Referring to FIG. 2, the image processing apparatus 200 according to an exemplary embodiment of the present inventive concept includes a data monitor 202 and a rendering frequency controller 204. Herein, the data monitor 202 may be referred to as a data monitor circuit of the image processing apparatus 200, and the rendering frequency controller 204 may be referred to as a rendering frequency controller circuit of the image processing apparatus 200. As described above with reference to FIG. 1, the image processing apparatus 200 may be implemented as the GPU controller 108 shown in FIG. 1. Accordingly, the image processing apparatus 200 may communicate with the CPU 102, the co-processor 104, the user interface 106, and the GPU 110 through the bus 120.

The data monitor 202 receives the first image rendered by the GPU 110 from the GPU 110. For example, in exemplary embodiments of the present inventive concept, the GPU 110 may receive image data and may render the first image. For example, the GPU 110 may receive the image data through an application executed by the CPU 102 or through the user interface 106, or may read image data stored in the memory 118 through the memory controller 116. Thereafter, the GPU 110 generates the first image by performing a rendering operation based on the received image data. The generated first image may be displayed on the display 114 through the display controller 112 and may be applied to the data monitor 202 of the image processing apparatus 200. The data monitor 202 transfers the received first image from the GPU 110 to a rendering frequency controller 204, which is described in further detail below.

In exemplary embodiments of the present inventive concept, the data monitor 202 may store the first image in a storage space such as, for example, the memory 118, before transferring the first image received from the GPU 110 to the rendering frequency controller 204. For example, if the data monitor 202 sequentially receives a plurality of rendered images from the GPU 110, the data monitor 202 may transfer the plurality of rendered images sequentially received from the GPU 110 to the rendering frequency controller 204. The data monitor 202 may transfer the plurality of rendered images at substantially the same time or at different times.

The rendering frequency controller 204 compares the first image received from the data monitor 202 with a second image rendered by the GPU 110 before the first image, and controls the rendering frequency of the GPU 110 based on the comparison result. In exemplary embodiments of the present inventive concept, the second image may be an image rendered by the GPU 110 immediately before the first image, however, exemplary embodiments of the present inventive concept are not limited thereto. In exemplary embodiments of the present inventive concept, the second image may be rendered image data received from the GPU 110 before the data monitor 202 receives the first image from the GPU 110. Herein, when a second image is described as being rendered before a first image, it is to be understood that the second image is rendered at an earlier time than the first image. Further, when a second image is described as being rendered immediately before a first image, it is to be understood that the second image is rendered at an earlier time than the first image and no intervening images are rendered between the first and second images.

The rendering frequency controller 204 compares the first image with the second image, and determines a degree of similarity between the first image and the second image. Herein, a degree of similarity between two images may also be referred to as a similarity score corresponding to the two images. For example, each of the first image and the second image includes a plurality of pixel areas. The degree of similarity between the first image and the second image may be determined, for example, by a ratio of the same pixel area between the first image and the second image to the entire pixel area of the first image or the entire pixel area of the second image. Here, the same pixel area may refer to, for example, a pixel area including pixels positioned in the same position in the first image and the second image and having the same color value. Therefore, it may be determined that the greater the ratio of the same pixel area between the first image and the second image to the entire pixel area of the first image or the second image, the higher the degree of similarity between the first image and the second image.

In exemplary embodiments of the present inventive concept, the degree of similarity may be used to control the rendering frequency of the GPU 110 together with the preset threshold value. The threshold value may be set as another value through the application executed by the CPU 102 or through a user's input received via the user interface 106. For convenience of explanation, in an exemplary scenario, it is assumed that the threshold value is set to 80%. If the degree of similarity between the first image and the second image is determined to be 90%, the rendering frequency controller 204 may determine that the first image and the second image are "similar" to each other (e.g., the first and second images have a high degree of similarity relative to the threshold value) and may suspend a rendering operation of the GPU 110 for the next image.

This finding is based on the assumption that there will not be a large difference between an image to be rendered next and the first image if the previously rendered first image and the second image are similar to each other. Accordingly, if a difference between an image to be rendered next and the first image is negligible, even when the image to be rendered next is not actually rendered and is then displayed on the display 114, a user of the display 114 may not perceive quality deterioration. As a result, the GPU 110 may not perform a rendering operation on the next image (e.g., a rendering operation on the next image may be skipped), thereby reducing power consumption.

Referring again to the exemplary scenario described above, when the degree of similarity between the first image and the second image is determined as, for example, 60%, the rendering frequency controller 204 determines that the first image and the second image are "not similar" to each other (e.g., the first and second images have a low degree of similarity relative to the threshold value), and controls the GPU 110 to render the next image. As described above, this finding is also based on the assumption that there will be a large difference between an image to be rendered next and the first image if the previously rendered first image and the second image are not similar to each other. Accordingly, when the image to be rendered next is not actually rendered, the user of the display 114 may perceive quality deterioration. Therefore, in this case, the GPU 110 renders the next image and then displays the rendered image on the display 114.

In exemplary embodiments of the present inventive concept, the suspending of the rendering operation of the GPU 110 by the rendering frequency controller 204 may include, for example, suspending the rendering operation of the GPU 110 for one or more images. For example, the rendering frequency controller 204 may transmit a "GPU DELAY" signal to the GPU 110. In exemplary embodiments of the present inventive concept, the suspending of the rendering operation of the GPU 110 by the rendering frequency controller 204 may include switching the GPU 110 to an idle state for a preset period of time. In this case, the GPU 110 may suspend other graphic processing operations in addition to the rendering operation.

Figure 3:
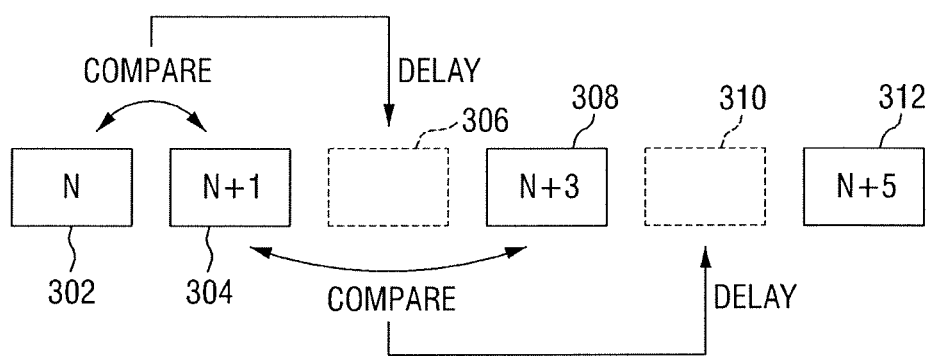
FIG. 3 is a schematic diagram illustrating an image processing method according to an exemplary embodiment of the present inventive concept.

FIG. 3 is a schematic diagram illustrating an image processing method according to an exemplary embodiment of the present inventive concept.

Referring to FIG. 3, the data monitor 200 receives a rendered (N+1)th image 304 from the GPU 110 and compares the (N+1)th image 304 with an Nth image 302. Here, the Nth image 302 may be an image rendered by the GPU 110 before the (N+1)th image 304. In exemplary embodiments of the present inventive concept, the Nth image 302 may be an image rendered by the GPU 110 immediately before rendering the (N+1)th image 304. Next, the rendering frequency of the GPU 110 is controlled based on the result of comparing the (N+1)th image 304 with the Nth image 302. When the degree of similarity between the (N+1)th image 304 and the Nth image 302 is greater than or about equal to the preset threshold value, as is the case in the present exemplary scenario, the rendering operation of the GPU 110 is suspended, and an (N+2)th image 306 is not rendered.

Next, an (N+3)th image 308 rendered by the GPU 110 is received from the GPU 110, and the (N+3)th image 308 is compared with the (N+1)th image 304. When the degree of similarity between the (N+3)th image 308 and the (N+1)th image 304 is greater than or about equal to the preset threshold value, as is the case in the present exemplary scenario, the rendering operation of the GPU 110 is suspended, and an (N+4)th image 310 is not rendered. An (N+5)th image 312 is then rendered. Thus, in the exemplary scenario according to an exemplary embodiment, the GPU 110 skips rendering operations on two images 306 and 310 that are expected to be similar to the respective previous images. As a result, according to exemplary embodiments of the present inventive concept, power consumption and deterioration in graphic quality may be reduced.

Figure 4:
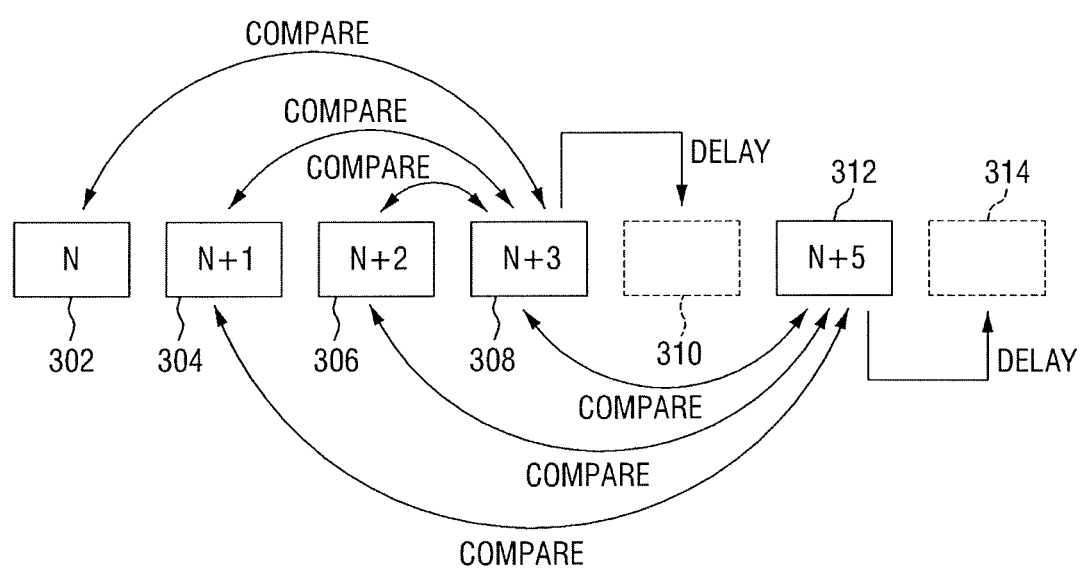
FIG. 4 is a schematic diagram illustrating an image processing method according to an exemplary embodiment of the present inventive concept.

FIG. 4 is a schematic diagram illustrating an image processing method according to an exemplary embodiment of the present inventive concept.

Compared to FIG. 3, in FIG. 4, when an (N+3)th image 308 rendered by a GPU 110 is received from the GPU 110, the (N+3)th image 308 is compared with each of an (N+2)th image 306, an (N+1)th image 304 and an Nth image 302, instead of being compared with only the (N+2)th image 306. In exemplary embodiments of the present inventive concept, the (N+2)th image 306 may be an image rendered by the GPU 110 immediately before the (N+3)th image 308, the (N+1)th image 304 may be an image rendered by the GPU 110 immediately before the (N+2)th image 306, and the Nth image 302 may be an image rendered by the GPU 110 immediately before the (N+1)th image 304.

Next, the (N+3)th image 308 and the (N+2)th image 306 are compared with each other to determine a first degree of similarity between the (N+3)th image 308 and the (N+2)th image 306. The (N+3)th image 308 and the (N+1)th image 304 are compared with each other to determine a second degree of similarity between the (N+3)th image 308 and the (N+1)th image 304. The (N+3)th image 308 and the Nth image 302 are compared with each other to determine a third degree of similarity between the (N+3)th image 308 and the Nth image 302. Thereafter, the rendering frequency of the GPU 110 is controlled based on an average value of the first degree of similarity, the second degree of similarity and the third degree of similarity. When the average value of the first degree of similarity, the second degree of similarity and the third degree of similarity is greater than or about equal to a preset threshold value, as is the case in the present exemplary scenario, the rendering operation of the GPU 110 is suspended, and the (N+4)th image 310 is not rendered.

Similarly, the rendering operation of the GPU 110 is suspended based on results of comparing an (N+5)th image 312 with each of the (N+3)th image 308, the (N+2)th image 306 and the (N+1)th image 304, and an (N+6)th image 314 is not rendered. Thus, in an exemplary scenario according to an exemplary embodiment, the GPU 110 skips rendering operations on two images 310 and 314 that are expected to be similar to the respective previous images. As a result, according to exemplary embodiments of the present inventive concept, power consumption and deterioration in graphic quality may be reduced. According to exemplary embodiments, the number of rendered images to be compared with each other may be adjusted through an application executed by the CPU 102 or through a user's input entered through the user interface 106.

Figure 5:
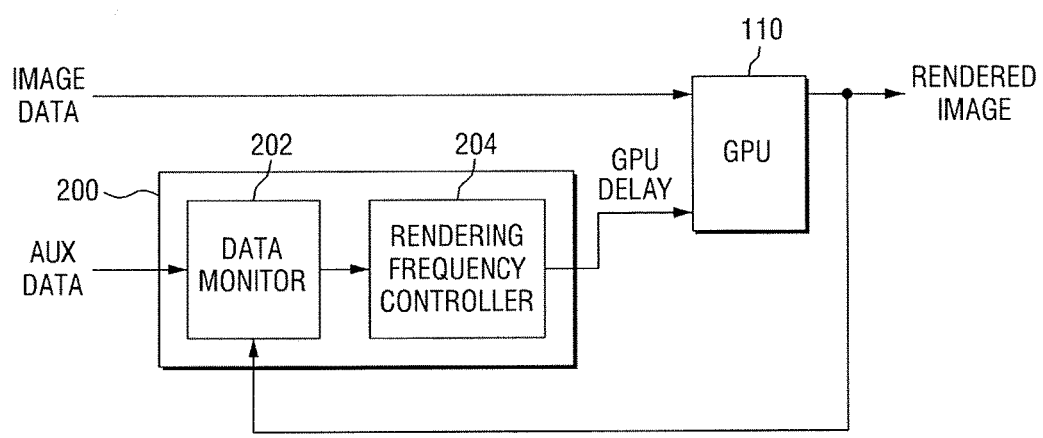
FIG. 5 is a block diagram of an image processing apparatus according to an exemplary embodiment of the present inventive concept.
Figure 6:
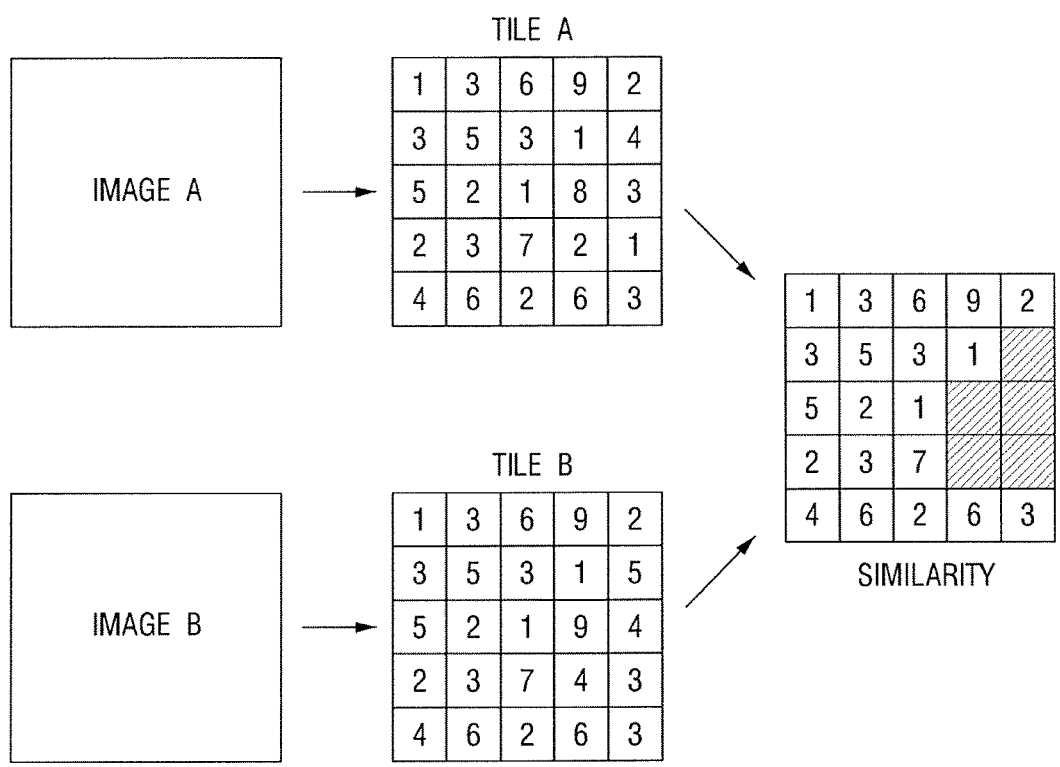
FIG. 6 is a schematic diagram illustrating a process of determining a degree of similarity between two images in the exemplary embodiment shown in FIG. 5 according to an exemplary embodiment of the present inventive concept.

FIG. 5 is a block diagram of an image processing apparatus according to an exemplary embodiment of the present inventive concept. FIG. 6 is a schematic diagram illustrating a process of determining a degree of similarity between two images in the exemplary embodiment shown in FIG. 5.

Referring to FIG. 5, in the image processing apparatus 200 according to an exemplary embodiment of the present inventive concept, the data monitor 202 receives the first image rendered by the GPU 110 and also receives first supplementary data associated with the first image rendered by the GPU 110, and transmits the same to the rendering frequency controller 204. The rendering frequency controller 204 compares the first supplementary data associated with the first image with second supplementary data associated with the second image when comparing the first image with the second image. In exemplary embodiments of the present inventive concept, the first supplementary data may include, for example, tile-based signature data corresponding to the first image and the second supplementary data may include, for example, tile-based signature data corresponding to the second image. In this case, the tile-based signature data for the first image and the second image may be provided from a hardware module located outside of the image processing apparatus 200 or may be processed by an application executed by the CPU 102.

Hereinafter, image comparison using tile-based signature data will be described with reference to FIG. 6. As shown in FIG. 6, pixels constituting an image A are grouped into a plurality of tiles, and attributes of pixels included in a pertinent tile may be represented by one value. For example, pixels constituting the image A may be grouped into a plurality of tiles having a 16×16 pixel size, and colors of the pixels included in the pertinent tile may be represented by one value. Accordingly, FIG. 6 shows that the image A is divided into 25 tiles (see TILE A) and each tile has a certain value. The certain value may refer to, for example, an average color value of pixels in each tile, however, the certain value is not limited thereto. Similarly, pixels constituting the image B may be grouped into 25 tiles (see TILE B). According to an exemplary embodiment, when the image A is compared with the image B to determine a degree of similarity between the image A and the image B, image comparison is performed on a tile-to-tile basis, rather than a pixel-to-pixel basis. Accordingly, the time and cost required for comparing two images may be reduced.

Figure 7:
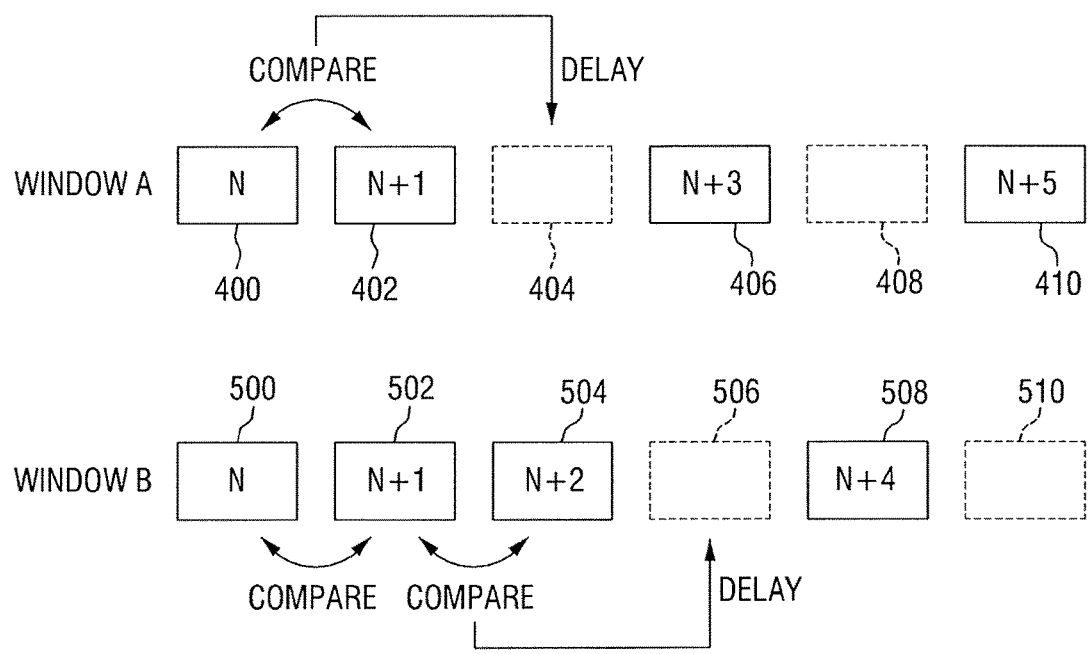
FIG. 7 is a schematic diagram illustrating an image processing method according to an exemplary embodiment of the present inventive concept.

FIG. 7 is a schematic diagram illustrating an image processing method according to an exemplary embodiment of the present inventive concept.

The image processing method according to an exemplary embodiment of the present inventive concept may be utilized in a case in which two or more graphics applications are executed on the display 114. In this case, image processing methods according to exemplary embodiments of the present inventive concept may be applied to each of the graphics applications. For convenience of explanation, different graphic applications that are simultaneously executed will now be referred to as a first window and a second window. However, exemplary embodiments are not limited thereto.

According to an exemplary embodiment, an image processing method includes receiving a first image rendered by a GPU 110 from the GPU 110 and displayed in a first window, receiving a second image rendered by the GPU 110 from the GPU 110 and displayed in a second window, comparing the first image with a third image rendered by the GPU 110 before the first image and displayed in the first window, comparing the second image with a fourth image rendered by the GPU 110 before the second image and displayed in the second window, and controlling the rendering frequency of the GPU 110 for the first window and the rendering frequency of the GPU 110 for the second window based on the results of comparing the first image with the third image and comparing the second image with the fourth image.

For example, referring to FIG. 7, image processing operations on a window A corresponding to the first window and a window B corresponding to the second window are independently performed. For example, when the degree of similarity between an (N+1)th image 402 and an Nth image 400 in the window A is greater than or about equal to a preset threshold value, a rendering operation of the GPU 110 is suspended and an (N+4)th image 404 is not rendered. When the degree of similarity between an (N+1)th image 502 and an Nth image 500 in the window B is less than the preset threshold value, the GPU 110 renders the next image to generate an (N+2)th image 504. Next, while an (N+3)th image 406 is rendered in the window A, the degree of similarity between the (N+2)th image 504 and the (N+1)th image 502 in the window B is greater than or about equal to the preset threshold value, and a rendering operation of the GPU 110 is suspended and an (N+3)th image 506 is not rendered. Referring to the window A, an (N+4)th image 408 and an (N+5)th image 410 are rendered. Referring to the window B, an (N+4)th image 508 and an (N+5)th image 510 are rendered.

Figure 8:
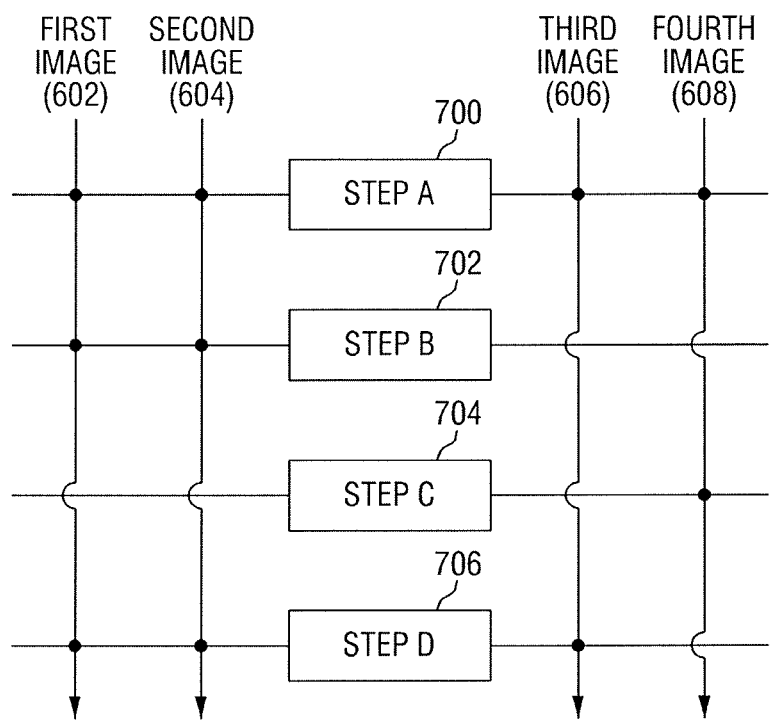
FIG. 8 is a schematic diagram illustrating an image processing method according to an exemplary embodiment of the present inventive concept.

FIG. 8 is a schematic diagram illustrating an image processing method according to an exemplary embodiment of the present inventive concept.

Referring to FIG. 8, the image processing method according to an exemplary embodiment of the present inventive concept may further include comparing an operation cycle of a first image 602 with an operation cycle of a second image 604 on the GPU 110. In FIG. 8, steps A to D (700, 702, 704 and 706) may refer to operations processed in sub-modules conceptually included in the GPU 110. For example, the step A (700) may be an operation processed in a texture module and the step B (702) may be an operation processed in an arithmetic operation module. However, exemplary embodiments are not limited thereto.

Referring to FIG. 8, comparing the first image 602 with the second image 604 may include comparing the first image 602 with the second image 604 only when an operation cycle of the first image 602 and an operation cycle of the second image 604 are substantially equal to each other. If the operation cycle of the first image 602 and the operation cycle of the second image 604 are different from each other, the first image 602 and the second image 604 may be determined not to be similar to each other without comparing the first image 602 with the second image 604. For example, when the operation cycles of the GPU 110 for rendered images are taken into consideration according to exemplary embodiments, unnecessary comparisons of images that are unlikely to be similar to each other may be omitted.

For example, as shown in FIG. 8, according to an exemplary embodiment, since both the operation cycle of the first image 602 and the operation cycle of the second image 604 include step A (700), step B (702) and step D (706), it may be necessary to determine a degree of similarity between the first image 602 and second image 604. In contrast, since an operation cycle of the third image 606 includes step A (700) and step D (706), and an operation cycle of the fourth image 608 includes step A (700) and step C (704), it is not necessary to determine a degree of similarity between the third image 606 and the fourth image 608. Therefore, in this exemplary scenario, the third image 606 and the fourth image 608 are not directly compared with each other, and the rendering frequency controller 204 may control the GPU 110 to render the next image.

Figure 9:
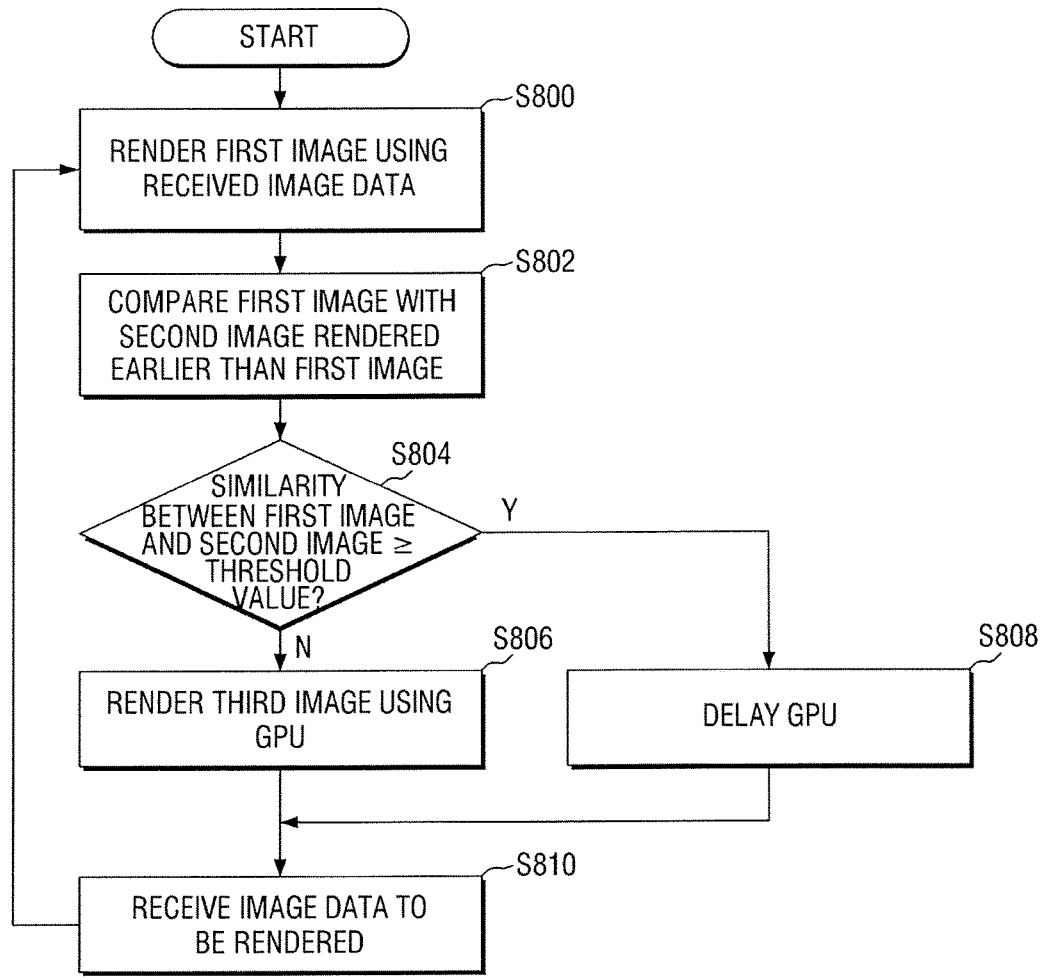
FIG. 9 is a flowchart illustrating an image processing method according to an exemplary embodiment of the present inventive concept.

FIG. 9 is a flowchart illustrating an image processing method according to an exemplary embodiment of the present inventive concept.

Referring to FIG. 9, the GPU 110 renders a first image using received image data (S800). The first image rendered by the GPU 110 is then compared with a second image rendered earlier than the first image (S802). Using the result of comparing the first image with the second image, it is then determined whether a degree of similarity between the first image and the second image is greater than or about equal to a preset threshold value (S804). If the degree of similarity between the first image and the second image is greater than or about equal to the preset threshold value, the GPU 110 is delayed (e.g., a rendering operation of the GPU 110 is suspended) (S808). However, if it is determined that the degree of similarity between the first image and the second image is less than the preset threshold value at S804, a third image is rendered by the GPU 110 (S806). The GPU 110 may then receive new image data to be rendered (S810).

Figure 10:
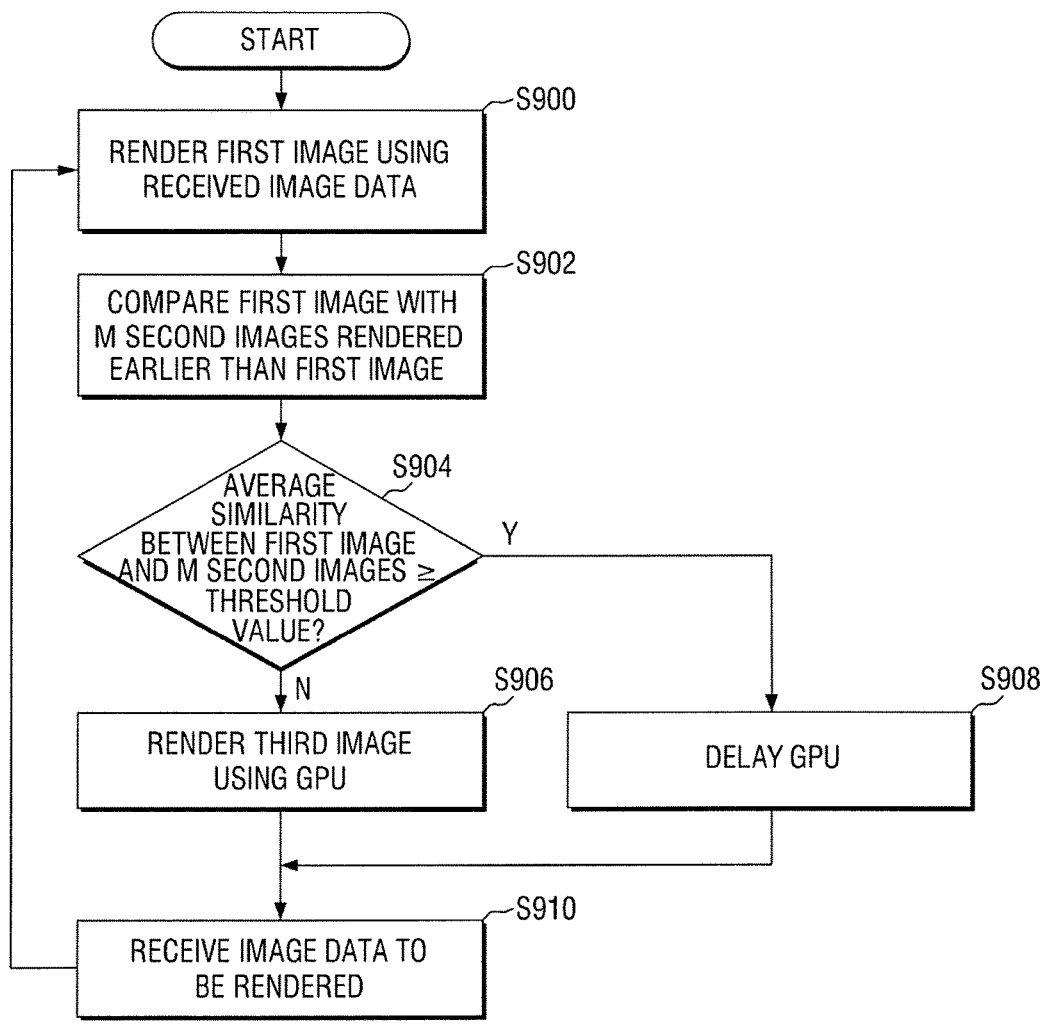
FIG. 10 is a flowchart illustrating an image processing method according to an exemplary embodiment of the present inventive concept.

FIG. 10 is a flowchart illustrating an image processing method according to an exemplary embodiment of the present inventive concept.

Referring to FIG. 10, the GPU 110 renders a first image using received image data (S900). The first image rendered by the GPU 110 is then compared with M second images rendered earlier than the first image, where M is a natural number greater than or equal to 2 (S902). Using the result of comparing the first image with the M second images, it is then determined whether an average degree of similarity between the first image and the M second images is greater than or about equal to a preset threshold value (S904). If the average degree of similarity between the first image and the M second images is greater than or about equal to the preset threshold, the GPU 110 is delayed (e.g., a rendering operation of the GPU 110 is suspended) (S908). However, if it is determined that the average degree of similarity between the first image and the M second images is less than the preset threshold value at S904, a third image is rendered by the GPU 110 (S906). The GPU 110 may then receive new image data to be rendered (S910).

Figure 11:
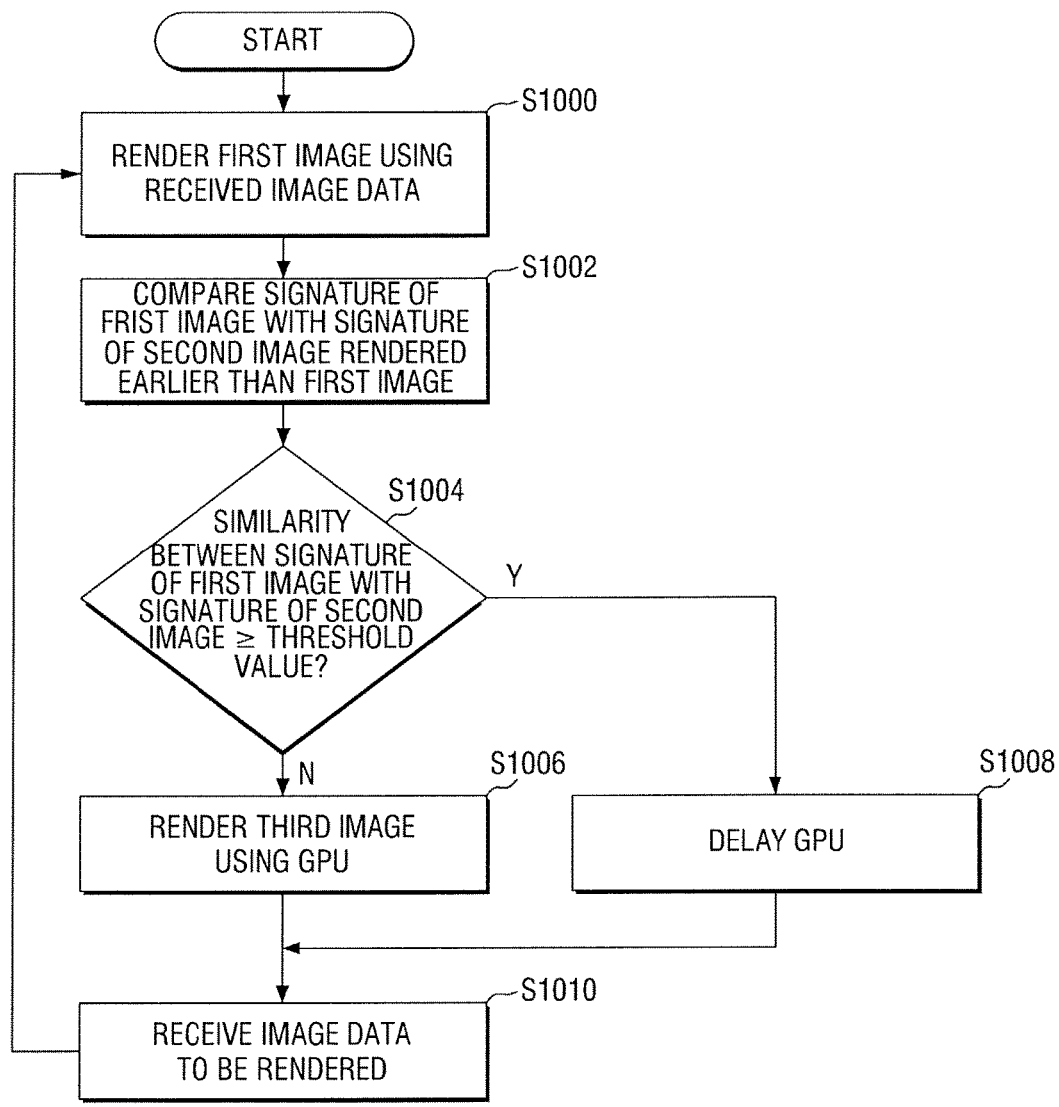
FIG. 11 is a flowchart illustrating an image processing method according to an exemplary embodiment of the present inventive concept.

FIG. 11 is a flowchart illustrating an image processing method according to an exemplary embodiment of the present inventive concept.

Referring to FIG. 11, the GPU 110 renders a first image using received image data (S1000). Then, in order to compare the first image rendered by the GPU 110 with a second image rendered earlier than the first image, a signature of the first image (e.g., a tile-based signature) is compared with a signature of the second image (S1002). Using the result of comparing the signature of the first image with the signature of the second image, it is then determined whether a degree of similarity between the signature of the first image and the signature of the second image is greater than or about equal to a preset threshold value (S1004). If the degree of similarity between the signature of the first image and the signature of the second image is greater than or about equal to the preset threshold value, the GPU 110 is delayed (e.g., a rendering operation of the GPU 110 is suspended) (S1008). However, if it is determined that the degree of similarity between the signature of the first image and the signature of the second image is less than the preset threshold value at S1004, a third image is rendered by the GPU 110 (S1006). The GPU 110 may then receive new image data to be rendered (S1010).

Figure 12:
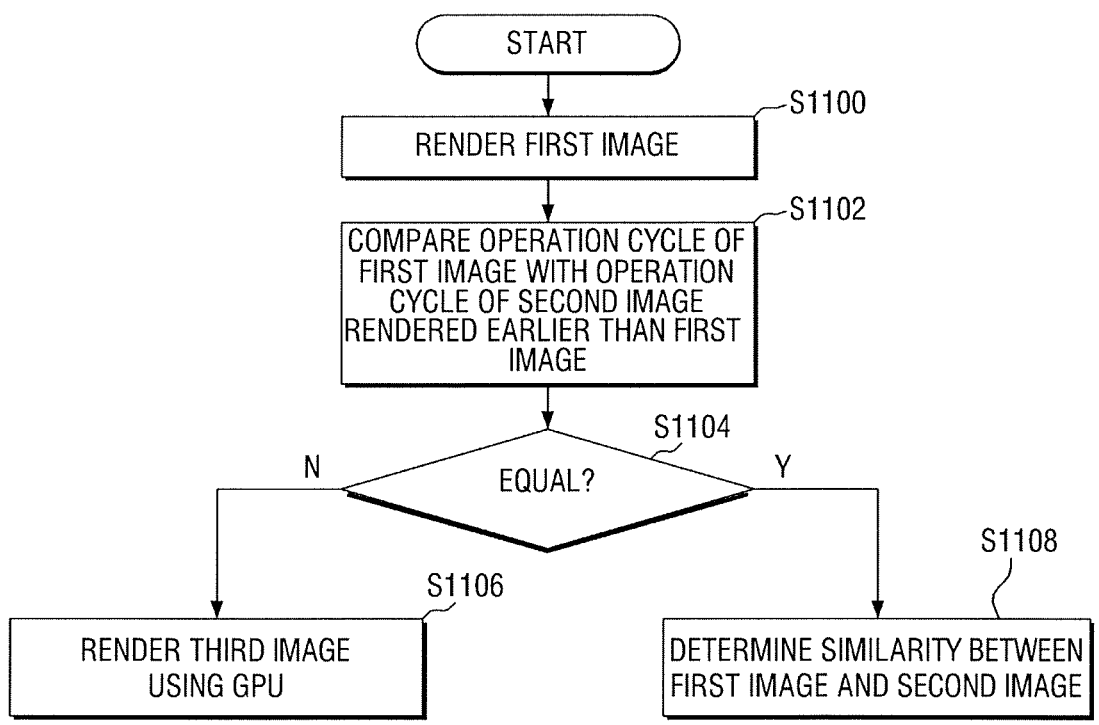
FIG. 12 is a flowchart illustrating an image processing method according to an exemplary embodiment of the present inventive concept.

FIG. 12 is a flowchart illustrating an image processing method according to an exemplary embodiment of the present inventive concept.

Referring to FIG. 12, a GPU 110 renders a first image using received image data (S1100). An operation cycle of the first image is then compared with an operation cycle of a second image rendered earlier than the first image (S1102). Using the result of comparing the operation cycle of the first image with the operation cycle of the second image, it is determined whether the operation cycle of the first image and the operation cycle of the second image are different from each other (S1104). If the operation cycle of the first image and the operation cycle of the second image are different from each other, a third image is rendered using the GPU 110 without comparing the first image with the second image (S1106). However, if it is determined that the operation cycle of the first image and the operation cycle of the second image are equal to each other at S1104, a degree of similarity between the first image and the second image is determined using the method described above with reference to FIGS. 9 to 11 (S1108).

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:
1. An image processing method, comprising:
receiving a first image rendered by a graphics processing unit (GPU) from the GPU;
comparing the first image with a second image rendered by the GPU before the first image; and controlling a rendering frequency of the GPU based on a result of comparing the first image with the second image,
wherein the second image comprises a first rendered image rendered by the GPU before the first image and a second rendered image, and controlling the rendering frequency of the GPU comprises:
comparing the first image with the first rendered image and determining a first degree of similarity between the first image and the first rendered image;
comparing the first image with the second rendered image and determining a second degree of similarity between the first image and the second rendered image; and
controlling the rendering frequency of the GPU based on an average value of the first degree of similarity and the second degree of similarity.

2. The image processing method of claim 1, wherein controlling the rendering frequency of the GPU comprises:
suspending a rendering operation of the GPU in response to determining that the first degree of similarity between the first image and the second image is greater than or about equal to a preset threshold value.

3. The image processing method of claim 2, wherein suspending the rendering operation of the GPU comprises:
suspending the rendering operation of the GPU for one or more images received subsequent to the first and second images.

4. The image processing method of claim 2, wherein suspending the rendering operation of the GPU comprises:
switching the GPU to an idle state for a preset period of time.

5. The image processing method of claim 2, wherein each of the first image and the second image comprises a plurality of pixel areas, and the first degree of similarity between the first image and the second image is determined based on a ratio of a same pixel area between the first image and the second image to an entire pixel area of the first image or the second image, wherein the same pixel area includes pixels positioned in a same position in the first image and the second image.

6. The image processing method of claim 1, wherein controlling the rendering frequency of the GPU comprises:
controlling the GPU to render a next image received subsequent to the first and second images in response to determining that the first degree of similarity between the first image and the second image is less than the preset threshold value.

7. The image processing method of claim 1, wherein controlling the rendering frequency of the GPU comprises:
suspending a rendering operation of the GPU in response to determining that the average value of the first degree of similarity and the second degree of similarity is greater than or about equal to the preset threshold value.

8. The image processing method of claim 1, further comprising:
receiving first supplementary data associated with the first image,
wherein comparing the first image with the second image comprises comparing the first supplementary data associated with the first image with second supplementary data associated with the second image.

9. The image processing method of claim 8, wherein the first supplementary data comprises first tile-based signature data corresponding to the first image and the second supplementary data comprises second tile-based signature data corresponding to the second image.

10. The image processing method of claim 1, further comprising:
comparing an operation cycle of the first image with an operation cycle of the second image,
wherein the first image is compared with the second image only when the operation cycle of the first image is equal to the operation cycle of the second image.

11. The image processing method of claim 10, wherein controlling the rendering frequency of the GPU comprises:
controlling the GPU to render a next image received subsequent to the first and second images without comparing the first image with the second image in response to determining that the operation cycle of the first image is different from the operation cycle of the second image.

12. An image processing method, comprising:
receiving a first image rendered by a graphics processing unit (GPU) and displayed in a first window;
receiving a second image rendered by the GPU and displayed in a second window,
wherein the first window corresponds to a first graphics application executed on a display and the second window corresponds to a second graphics application executed on the display, and the first and second graphics applications are simultaneously executed;
comparing the first image with a third image rendered by the GPU before the first image and displayed in the first window;
comparing the second image with a fourth image rendered by the GPU before the second image and displayed in the second window; and
controlling a first rendering frequency of the GPU for the first window and a second rendering frequency of the GPU for the second window based on a result of comparing the first image with the third image and comparing the second image with the fourth image.

13. The image processing method of claim 12, wherein controlling the first rendering frequency and the second rendering frequency comprises:
suspending at least one of a first rendering operation of the GPU corresponding to the first window and a second rendering operation of the GPU corresponding to the second window.

14. An image processing apparatus, comprising:
a data monitor configured to receive a first image rendered by a graphics processing unit (GPU); and
a rendering frequency controller configured to receive the first image from the data monitor, compare the first image with a second image rendered by the GPU before the first image, compare the first image with a third image rendered by the GPU before the first image, determine a first degree of similarity between the first image and the second image, determine a second degree of similarity between the first image and the third image, and control a rendering frequency of the GPU based on an average value of the first degree of similarity and the second degree of similarity.

15. The image processing apparatus of claim 14, wherein the rendering frequency controller is configured to suspend a rendering operation of the GPU in response to determining that the first degree of similarity between the first image and the second image is greater than or about equal to a preset threshold value.

16. The image processing apparatus of claim 15, wherein the rendering frequency controller is configured to suspend the rendering operation of the GPU for one or more images received subsequent to the first and second images.

17. The image processing apparatus of claim 15, wherein each of the first image and the second image comprises a plurality of pixel areas, and the first degree of similarity between the first image and the second image is determined based on a ratio of a same pixel area between the first image and the second image to an entire pixel area of the first image or the second image, wherein the same pixel area includes pixels positioned in a same position in the first image and the second image.

18. An image processing apparatus, comprising:
a data monitor configured to receive a first image rendered by a graphics processing unit (GPU) and displayed in a first window, and receive a second image rendered by the GPU and displayed in a second window,
wherein the first window corresponds to a first graphics application executed on a display and the second window corresponds to a second graphics application executed on the display and the first and second graphics applications are simultaneously executed; and
a rendering frequency controller configured to compare the first image with a third image rendered by the GPU before the first image and displayed in the first window, compare the second image with a fourth image rendered by the GPU before the second image and displayed in the second window, and control a first rendering frequency of the GPU for the first window and a second rendering frequency of the GPU for the second window based on a result of comparing the first image with the third image and comparing the second image with the fourth image.

19. The image processing apparatus of claim 18, wherein the rendering frequency controller is configured to suspend at least one of a first rendering operation of the GPU corresponding to the first window and a second rendering operation of the GPU corresponding to the second window.

* * * * *